United States Patent
Cummins et al.

(10) Patent No.: US 9,881,289 B2
(45) Date of Patent: Jan. 30, 2018

(54) SYSTEM AND METHOD FOR POINT OF SALE TRANSACTION LOGGING

(71) Applicant: POMO SEARCH LTD, Drogheda, Co. Louth (IE)

(72) Inventors: Mark Joseph Cummins, Charlotte Quay Dock (IE); Ian Cummins, Donnybrook (IE)

(73) Assignee: POMO SEARCH LTD., Drogheda, Co. Louth (IE)

( * ) Notice: Subject to any disclaimer, the term of this patent is extended or adjusted under 35 U.S.C. 154(b) by 38 days.

(21) Appl. No.: 14/603,587

(22) Filed: Jan. 23, 2015

(65) Prior Publication Data
US 2015/0206118 A1    Jul. 23, 2015

Related U.S. Application Data

(60) Provisional application No. 61/930,603, filed on Jan. 23, 2014.

(51) Int. Cl.
*G06Q 20/20* (2012.01)
*G07G 1/00* (2006.01)
(Continued)

(52) U.S. Cl.
CPC ......... *G06Q 20/203* (2013.01); *G06Q 20/202* (2013.01); *G06Q 20/3276* (2013.01);
(Continued)

(58) Field of Classification Search
CPC ...... G06Q 20/20; G06Q 20/322; G06Q 30/02; G06Q 30/06; G06Q 20/36; G06Q 20/203;
(Continued)

(56) References Cited

U.S. PATENT DOCUMENTS

| | | | |
|---|---|---|---|
| 8,401,911 B1 * | 3/2013 | Chu | G06Q 10/087 705/14.51 |
| 2011/0068906 A1 * | 3/2011 | Shafer | G06K 7/0008 340/10.3 |

(Continued)

OTHER PUBLICATIONS

International Search Report and Written Opinion dated Aug. 31, 2015 issued in International Application No. PCT/IB2015/000890, pp. 1-11.

(Continued)

*Primary Examiner* — Sonji Johnson
(74) *Attorney, Agent, or Firm* — MH2 Technology Law Group LLP

(57) ABSTRACT

The present disclosure generally relates to a method and a hardware and software system for collecting data from retch point of sale. The hardware connects to a wide variety of barcode scanners and receipt printers. Collected data is transmitted to a cloud-based infrastructure backend system using a wireless inter net connection built into the hardware. The collected data can be processed to extract item-level transaction information, and estimate the price and in-stock status of items in particular shops. A search engine can be provided using this data, which allows a customer to discover which nearby shop has an item of interest in stock. A targeted advertising system that complements this search service is also presented. The data can be used by retailers and manufacturers for business analysis and optimization.

18 Claims, 12 Drawing Sheets

(51) Int. Cl.
*G07G 1/14* (2006.01)
*G06Q 30/06* (2012.01)
*G06Q 20/32* (2012.01)
*G06Q 30/02* (2012.01)

(52) U.S. Cl.
CPC ......... *G06Q 30/02* (2013.01); *G06Q 30/0222* (2013.01); *G06Q 30/0238* (2013.01); *G06Q 30/0256* (2013.01); *G06Q 30/0623* (2013.01); *G07G 1/0045* (2013.01); *G07G 1/14* (2013.01)

(58) Field of Classification Search
CPC ........... G06Q 30/0256; G06Q 30/0238; G06Q 30/0222; G06Q 20/3276; G06Q 30/0623; G06Q 20/202; G06Q 20/352; G06Q 20/40; G06Q 20/204; G07G 1/14; G07G 1/0045

See application file for complete search history.

(56) References Cited

U.S. PATENT DOCUMENTS

| | | | |
|---|---|---|---|
| 2011/0080267 A1* | 4/2011 | Clare | G01S 13/82 340/10.4 |
| 2011/0184822 A1* | 7/2011 | Matkovic | G06Q 20/202 705/18 |
| 2011/0246284 A1* | 10/2011 | Chaikin | G06Q 20/105 705/14.38 |
| 2011/0251879 A1 | 10/2011 | Lambert et al. | |
| 2011/0276378 A1 | 11/2011 | Pointer et al. | |
| 2011/0276385 A1* | 11/2011 | Keller | G06Q 20/202 705/14.38 |
| 2012/0016856 A1* | 1/2012 | Gandhi | G06Q 20/20 707/705 |
| 2013/0275192 A1 | 10/2013 | Aissa | |
| 2013/0304553 A1* | 11/2013 | Hertel | G06Q 30/02 705/14.23 |
| 2014/0257964 A1* | 9/2014 | Bakker | G06Q 30/0238 705/14.38 |
| 2015/0127428 A1* | 5/2015 | Gharachorloo | G06Q 30/0283 705/7.35 |
| 2015/0199882 A1* | 7/2015 | Fernando | G07G 1/0018 345/173 |
| 2017/0243242 A1* | 8/2017 | Chaikin | G06Q 30/0238 |

OTHER PUBLICATIONS

International Search Report and Written Opinion dated Aug. 12, 2015 issued in International Application No. PCT/IB2015/000560, pp. 1-11.

* cited by examiner

SYSTEM AND METHOD FOR POINT OF SALE TRANSACTION LOGGING

RELATED APPLICATIONS

The present application claims priority to and the benefit of U.S. Provisional Patent Application No. 61/930,603 entitled "AN AUTOMATED DATA COLLECTION AND SEARCH SYSTEM FOR PHYSICAL GOODS" and filed Jan. 23, 2014, the disclosure of which is hereby incorporated by reference in its entirety. The present application is related to U.S. patent application Ser. No. 14/603,712 entitled "SYSTEM AND METHOD FOR REDEEMING A DISCOUNT" filed Jan. 23, 2015.

FIELD

This disclosure relates generally to retail transaction management.

BACKGROUND

In the most general sense, searching for information on the web is well-known. However, some information is still unavailable online, such as information identifying local shops that stock an item of interest. For example, a customer looking for an uncommon item (e.g., a foreign brand of soft drink) might net have any idea which shop will carry the item. Similarly, a customer might have difficulty finding a store that has a high-demand item currently in stock. It would be very useful in these circumstances if the customer could search the inventory of local shops with the same ease with which they can search the web.

SUMMARY

According to some embodiments, a system for logging retail purchases, the system including a logger device configured for installation at a retail location, is presented. The system includes a first connector configured to be communicatively coupled to a point of sale system at the retail location, a second connector configured to be communicatively coupled to a point of sale peripheral at the retail location, at least one electronic processor configured to receive point of sale data from at least one of the point of sale system or the point of sale peripheral and extract product information therefrom, and a wireless interface configured to direct the product information to a backend system, such that the logger device receives the point of sale data and uploads the product information without disrupting communication between the point of sale system and the point of sale peripheral.

Various optional features of the above embodiments include the following. The point of sale system may include a cash register and the point of sale peripheral may include at least one of a receipt printer or a barcode scanner. The point of sale peripheral may include a barcode scanner, and the product information may include barcode data. The product information may include at least one of: product price, location of sale, and time of sale. At least one of the backend system or the logger device may be configured to estimate a product inventory at the retail location. The system may include a search engine configured to accept queries for retail products and provide search results based at least in part on the product inventory. The system may include a website associated with the retailer, and the website may be configured to provide the product inventory. The point of sale peripheral may include a receipt printer, and the point of sale data may be sent from the point of sale system to the receipt printer, the system further including an optical character resolution engine configured to generate computer readable text from the point of sale data. The point of sale peripheral may include a barcode scanner, and the point of sale data may be sent from the barcode scanner, where the at least one processor may be configured to augment the point of sale data to produce augmented point of sale data, and where the augmented point of sale data may be sent to the point of sale system. The wireless interface may be configured to direct the product information to an internet-connected device configured to send the product information to the backend system.

According to some embodiments, a method of logging retail purchases using a logger device communicatively coupled to a point of sale system and to a point of sale peripheral at a retail location is presented. The method includes obtaining point of sale data, by the logger device, via at least one of the point of sale system, the point of sale peripheral, without disrupting communication between the of it of sale system and the point of sale peripheral, extracting product information from the point of sale data, and directing, by a wireless interlace of the logger device, the product information to a backend system.

Various optional features of the above embodiments include the following. The point of sale system may include a cash register and the point of sale peripheral may include at least one of a receipt printer or a barcode scanner. The point of sale peripheral may include a barcode scanner, and the product information may include barcode data. The product information may include at least one of product price, location of sale, and time of sale. The method may include estimating a product inventory at the retail location by at least one of the backend system or the larger device. The method may include providing a search engine configured to provide search results based at least in part on the product inventory in response to a query for a retail product. The method may include providing a website associated with the retailer, where the website is configured to provide the product inventory. The point of sale peripheral may include a receipt printer, and the point of sale data may be sent from the point of sale system to the receipt printer, where the method may further include generating from the point of sale data, by an optical character resolution engine, computer readable text. The point of sale peripheral may include a barcode scanner, and the point of sale data may be sent from the barcode scanner, where the method further includes: augmenting the point of sale data to produce augmented point of sale data, and sending the augmented point of sale data to the point of sale system. The directing may include directing the product information to an internet-connected device configured to send the product information to the backend system.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
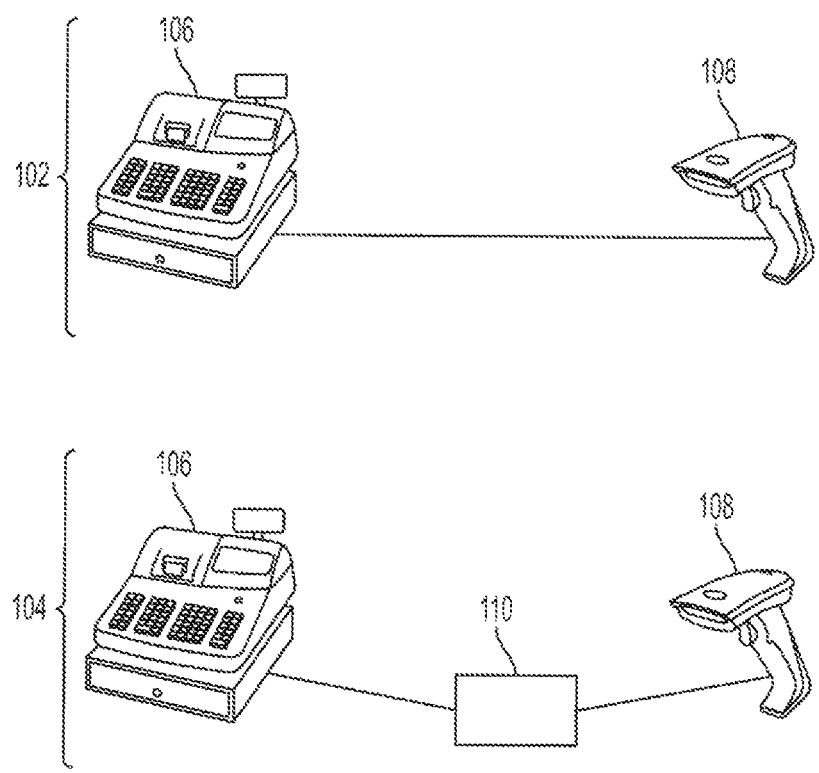
FIG. 1 is a schematic diagram of a point of sale logger device installation according to some embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments solve longstanding problems relating to searching for in-stock items in local stores. Thus, some embodiments provide customers with the ability to input the name or description of an item as a search query into a search engine app executing on their smart hone (or other mobile device) and be presented with a map or list of local shops which have (or are likely to have) the item in stock, along with relevant ancillary information such as price, shop opening hours and directions, number of items left in stock, product reviews, delivery/collect/reserve options, etc.

There area few existing services that attempt to partially address the local product search problem; however they each have significant shortcomings. A small number of major retailers provide an inventory search service on their websites. However, this single-retailer search is of limited use to a customer who wishes to search for an item across multiple retailers simultaneously. Some services (e.g., Milo.com and eBay Now) permit customers to search across several retailers simultaneously. However, the data in these services is obtained by integrating with the existing inventory systems of a small number of large retailers. Thus data from small local stores is absent.

There is another class of service, exemplified by Goodzer.com, that work by crawling the websites of retailers, extracting product information and store address details, and then making the assumption that any product listed on a retailer's website will be available for sale in-store. While this approach provides the appearance of much greater coverage, it has significant limitations. First, it is often not true that all products listed on a retailer's website will be available in every store. Items may be out of stock, available only in larger stores, no longer carried, etc. Second, online and in-store pricing may differ. Third, the process of automatically extracting information from retailer websites is subject to error. Finally, only a small fraction of stores have a website that lists their product catalogue. All stores without such a website are invisible to these services.

Some newer-generation payment providers and/or point of sale systems are now integrated with an online presence. A typical offering is Square Market from Square Inc. In such systems, retailers have the option to automatically list for sale online inventory they enter into their in-store point of sale system. A limitation is that retailers must replace their point of sale systems to avail of this service, which may be highly disruptive and expensive for the retailer.

Embodiments described herein solve the above-described problems. To do so, some embodiments utilize a hardware logger device that, the retailer attaches to both their cash register and to their barcode scanner and/or receipt printer. Once installed, the logger device may operate without any retailer intervention. The logger device may use its internal internet connectivity to transmit the information associated with each retail transaction to a cloud-based infrastructure backend system. The information transmitted may include time of transaction, barcode numbers and/or the data sent to the receipt printer from which can be extracted information relating to product name and price. By capturing the stream of transaction information from a store using this logger device, over time, the backend system may build up a complete picture of the items sold in store. It is also possible to obtain an estimate of the in-stock status of a given item at a particular time. A detailed description of the components of the system follows.

FIG. 1 is a schematic diagram of a point of sale logger device installation according to some embodiments. In particular, FIG. 1 depicts a typical point of sale arrangement 102, including a point of sale system (here, a cash register) 106 communicatively coupled, e.g., via a universal serial bus (USB) cable, to a point of sale peripheral (here, a barcode scanner) 108.

Barcode scanner 108 may be a known piece of retail equipment that reads a barcode on a product package and transmits a corresponding barcode datum to the point of sale system. The barcode may be a one-dimensional barcode, a quick response (QR) code, etc. The barcode datum is typically unique to a particular product and common across ail retailers (with limited exceptions). In general, barcode scanners are quite diverse: they come in a wide variety of shapes and sizes and operate on a variety of different physical principles.

In the typical point of sale arrangement 102, barcode scanner 108 is connected as a point of sale peripheral to point of sale system cash register 106 using a cable. Several cable types are in common use; the most common are USB cables, serial cables and PS/2 cables. In the case of USB and serial cables, the barcode datum may be transmitted over the cable in a variety of different message formats.

FIG. 1 also depicts a point of sale arrangement 104 according to some embodiments. In such an arrangement, logger device 110 is inserted between the barcode scanner and the point of sale system. Thus, the barcode scanner cable is connected to logger device 110, which is in turn connected to the point of sale system, e.g., by another cable, which may be permanently attached to, or removable from, logger device 110. When logger device 110 is installed, barcode scanner 108 can still communicate with the point of sale system cash register 106 as normal (and vice versa). As elaborated upon herein, according to some embodiments a function of logger device 110 is to make a copy of any data that is transmitted from barcode scanner 108 to cash register 106 (and vice versa).

In some circumstances, logger device 110 may also receive data, from barcode scanner 108, process the data, and transmit modified data to the cash register 106. This permits certain features of a discount handling system as presented elsewhere herein. Logger device 110 may also internally generate a message for transmission to cash register 106, which cash register 106 may interpret as a message from the barcode scanner.

Logger device 110 also has a connection to the internet. Logger device 110 may use its internet connection to periodically transmit recorded data (in raw or processed/summarized form) to a cloud-based server backend system, along with meta-data such as when and where the data was recorded. Transmission may happen every second, every 10 seconds, every minute, every hour, daily, etc. Transmission may also be triggered by some other criteria, e.g. after a certain period of inactivity, or once a certain number of barcodes or other data have been collected.

Although logger device 110 is depicted as connected to barcode scanner 108 in FIG. 1, in some embodiments, it may be connected to a receipt printer in addition or instead. A logger configured for receipt printer connection may be identical or similar to the logger for barcode scanners. One reason to log data from a receipt printer in addition to from a barcode scanner is that it provides additional information about a transaction, such as item prices and product names.

Figure 2:
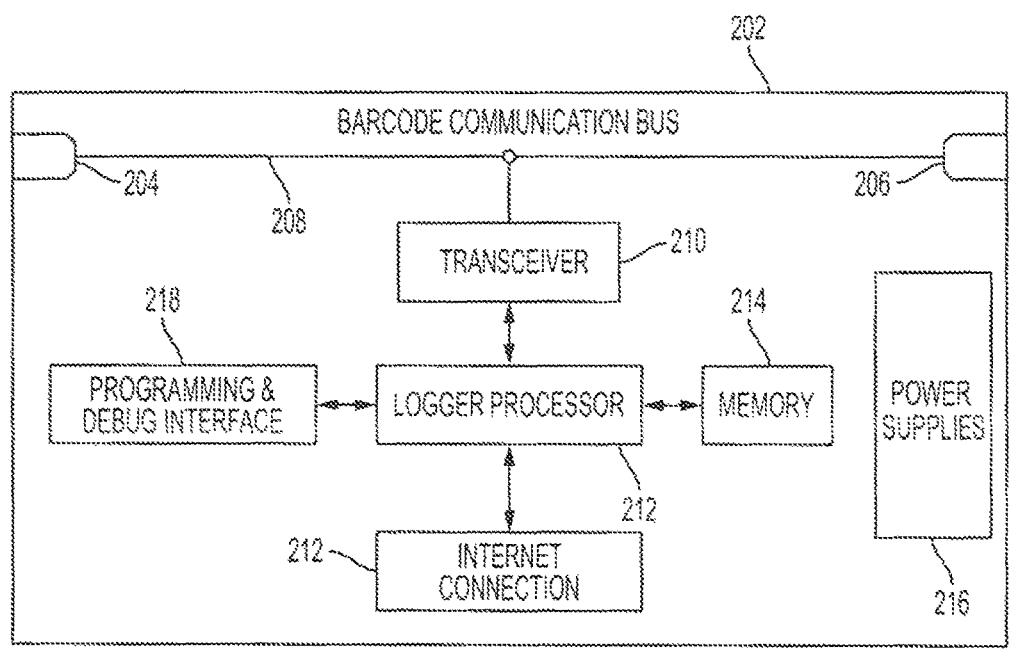
FIG. 2 is a schematic diagram depicting internal components of a point of sale logger device according to some embodiments.

FIG. 2 is a schematic diagram depicting internal components of a point of sale logger device according to some embodiments. Logger device 202 may be point of sale logger device 110 of FIG. 1, for example. Logger device 202 may be housed in a small unobtrusive enclosure of plastic and/or metal, for example. The enclosure may include a bracket or region receptive to double-sided tape, for example, to secure logger device 202 to a fixture at a point of sale. Suitable fixtures include, for example, a cash register to which logger device 202 is communicatively coupled.

Logger device 202 includes several internal components. For example, logger device 202 includes one or more electronic processors 202 configured to at least partially implement certain methods disclosed herein. Logger device 202 also includes one or more power supplies 216, sufficient to power components internal to logger device 202. Alternately, or in addition, logger device 202 may be coupled to a power source such as a wall outlet. Logger device 202 also includes a programming and debugging interface 218, which may be connectable to a computer for purposes of programming and testing. Logger device 202 also includes memory 214, which may include persistent (e.g., flash) and/or volatile (e.g., DRAM or SRAM) memory devices.

Logger device 202 also includes internet connection hardware 212, which enables it to connect to the internet. Several alternative designs are possible. One option is for logger device 202 to contain a built-in cellular modem. An alternative design is for logger device 202 to contain a built-in WiFi chip and utilize an external WiFi network, e.g., as provided by the retailer. Yet another possibility is to use a hotspot design: the hotspot may be a separate device that contains a built-in cellular modem and is able to share this connection with other nearby devices by means of WiFi or some other short-range communications technology (e.g. Bluetooth, ZigBee), and logger device 202 includes hardware that permits such short-range communications with the hotspot. In such an arrangement, logger device 202 may connect to the internet via the hotspot. Note that any information logger device 202 transmits over the internet may be encrypted and/or digitally signed to guarantee its authenticity and prevent various types of system tampering.

Logger device 202 also includes ports 204 and 206 for coupling logger device 202 to a point of sale system (e.g., a cash register) and to a point of sale peripheral (e.g., a barcode scanner). As previously described, there are several common cable systems used to connect barcode scanners to point of sale cash registers. Logger device 202 may include ports configured to couple to any of a variety of cable types. In some embodiments, logger device 202 may be designed for one cable type (e.g., USB connections), and be sold together with converters that allow it to work with the other cable types.

Figure 3:
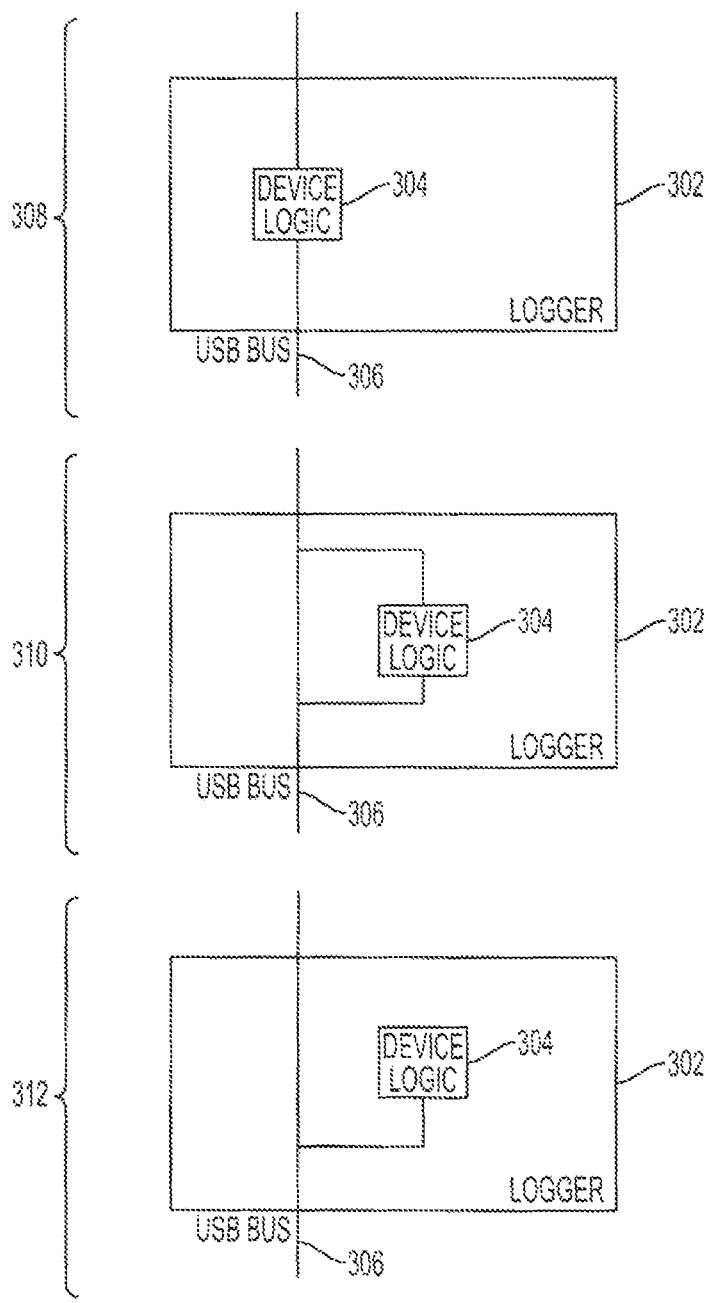
FIG. 3 is a schematic diagram of several communication bus configurations of a point of sale logger device according to some embodiments.

Logger device 202 is able to obtain a copy of messages traveling on communications bus 208 that exists between the point of sale peripheral and the point of sale system (e.g. the USB bus in the case of the USB logger). Logger device 202 may do so without disrupting the communication between the point of sale system and the point of sale peripheral. There are three basic options for how this can be achieved: in-series connection to bus 208, in-parallel connection to bus 208, or by sampling from bus 208 without participating in the bus protocol. FIG. 3 below elaborates on such options.

FIG. 3 is a schematic diagram of several communication bus configurations of a point of sale logger device according to some embodiments. Each connection option 308, 310, 312 has associated advantages.

Option 312 represents that logic 304 of logger device 302 may sample from bus 306 without participation in bus communications. Option 312 thus offers the lowest chance of disrupting communication between the barcode scanner and the point of sale system. In this design, logger device 302 passively samples from the bus, for example, using an analogue-to-digital converter. Logger device 302 can reconstruct a copy of the communications between the barcode scanner and the point of sale system, but cannot participate in the communications.

Option 310 represents that logic 304 of logger device 302 may obtain a copy of messages on bus 302. An advantage of this design is that logic 304 of logger device 302 can insert its own messages onto bus 306.

Option 308 represents that logic 304 of logger device 302 may receive messages from the barcode scanner and then re-transmit them to the point of sale system. This design allows logger device 302 to receive a message from the barcode scanner, process it, and send a modified message to the point of sale system. This ability is useful in some scenarios.

Figure 4:
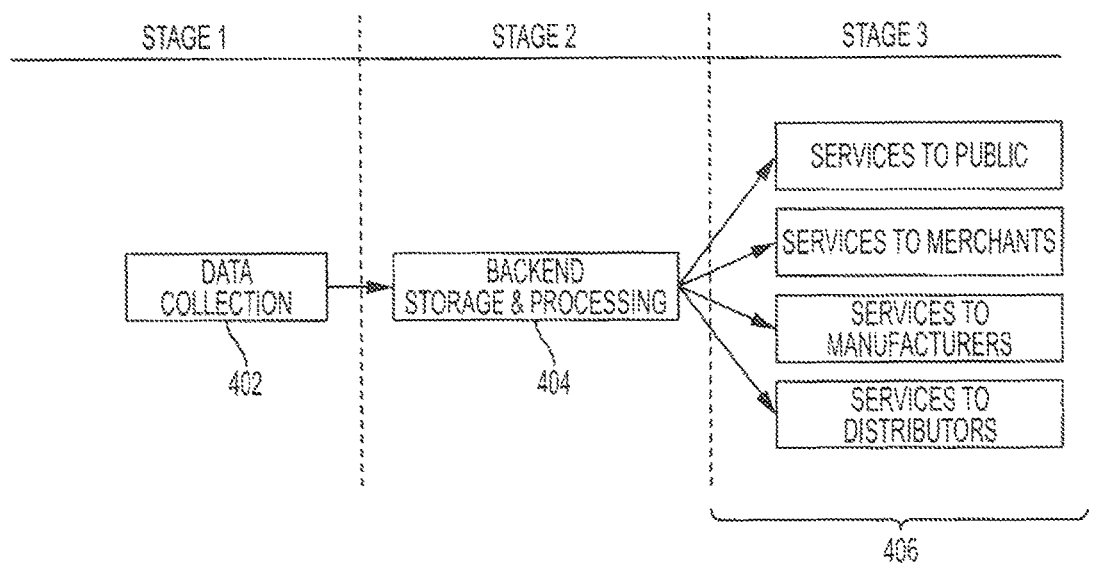
FIG. 4 is a high-level schematic diagram of a system and method according to some embodiments.

FIG. 4 is a high-level schematic diagram of a system and method according to some embodiments. In broad terms, the system includes data collection stage 402, backend storage and processing stage 404, and service stage 406. Data collection stage 402 automatically collects local product inventory information. Backend storage and processing stage 404 processes, stores on a backend system, and then uses the local product inventory information at service stage 406 to provide services to the public, merchants, manufacturers and distributors.

A component of data collection stage 402 is a hardware logger device (e.g., 110 of FIG. 1, 202 of FIG. 2, 302 of FIG. 3) which can collect transaction data from a wide variety of retail point of sale systems. The logger device can be inserted between a point of sale system such as a cash register and a peripheral such as a barcode scanner or receipt printer. The logger device allows normal communication between the point of sale system and the peripheral, while recording data transmitted in either direction. The logger device uses an internal internet connection to send the recorded data (or processed versions of it) to a remote server infrastructure backend system. The transmitted data may be augmented with additional information such as the time and location at which it was recorded, etc. The logger device may be widely compatible with existing retail equipment and can be installed without requiring any existing equipment to be replaced.

Backend storage and processing stage 404 uses processing techniques to extract or estimate key information using the logged data. Information to be extracted may include, by way of non-limiting example, any or a combination, of: barcode number, product name, price of items sold, time and location of sale, the sets of item sales that form a single customer transaction, detection of non-sales events (such as refunds, returns, discount redemptions, etc.), an estimate of whether or not an item is in stock in a store at a particular time and/or the number of units of each item in stock, any other ancillary information that might be useful for analysis (e.g., logger identification, name of cashier, customer loyalty program membership, etc.), and generic information about the store that can be determined by analysis of the logged data, e.g., opening hours, top-selling products, etc.

Backend storage and processing stage 404 may use any of a variety of processing techniques to extract the above data Example processing steps include any, or a combination, of: synchronizing logs from multiple logger devices so that information from multiple loggers which relates to the same transaction can be combined, detecting the encoding of the logged data and converting to a standardized format, complex decoding processes such as applying optical character recognition (OCR) to extract text from printer logs, and determining the product name, image and other information corresponding to a barcode number. The latter may involve any, or a combination, of several sub-methods, such as: use of data providers, extraction of information from the web, crowd-sourced data from customers and/or other manual processing, and determination of the name based on logs from receipt printers across many shops, possibly in combination with external data such s the web and/or language models.

Service stage 406 may include any of a variety of services. An example service is providing a search engine that permits customers to search among the collected and processed data. The search engine may be presented on a publicity available we page. Such a search engine may allow customers to determine which retailers sell a product of interest, along with key information such as price, in-stock status, store location and opening hours, product image details and reviews, etc. Note that customer searches need not be for a specific product, but might be for a more general need such as "umbrellas" or "gluten-free food", etc. Advertisements for products or discounts may be presented on the same web page or app screen as the search engine.

Another example service is providing a webpage, app, online store automatically constructed for each retailer using the collected and processed data. Such a web page, app, or online store may present items available for sale by the retailer.

Another service is providing analysis tools for retailers, product manufacturers and others utilizing the collected and processed data. There are a large number of uses for the collected data, for exam*: real-time sales tracking, measurement of the impact of advertising campaigns, short term demand prediction, etc. The data may also suggest optimization possibilities for retailers or manufacturers, for example: identification of products that might sell well in a particular store that are not currently sold there, identification of items typically bought together can be used to guide better in-store item placement, etc. The data may also be of interest to financial market participants, for example as a real-time indicator of product sales or as a macroeconomic signal for inflation measurement, etc.

The search engine may benefit from any of a variety of revenue models. For example, the search engine may utilize pay-per-visit advertising, in which an advertiser pays only when a customer physically visits a particular store/stores in response to an ad. As another example, the search engine may utilize a reservation based model, in which the retailer pays when a customer reserves a product for purchase via the disclosed system and subsequently visits the store (with or without verification of item purchase). As yet another example, the search engine may integrate with a system for discount-based advertising utilizing the logger device for processing discount redemption. The discounts may be targeted and individualized based on the customer's usage of the search service.

These and other example services are described in detail herein in reference to FIG. 6, below.

Figure 5:
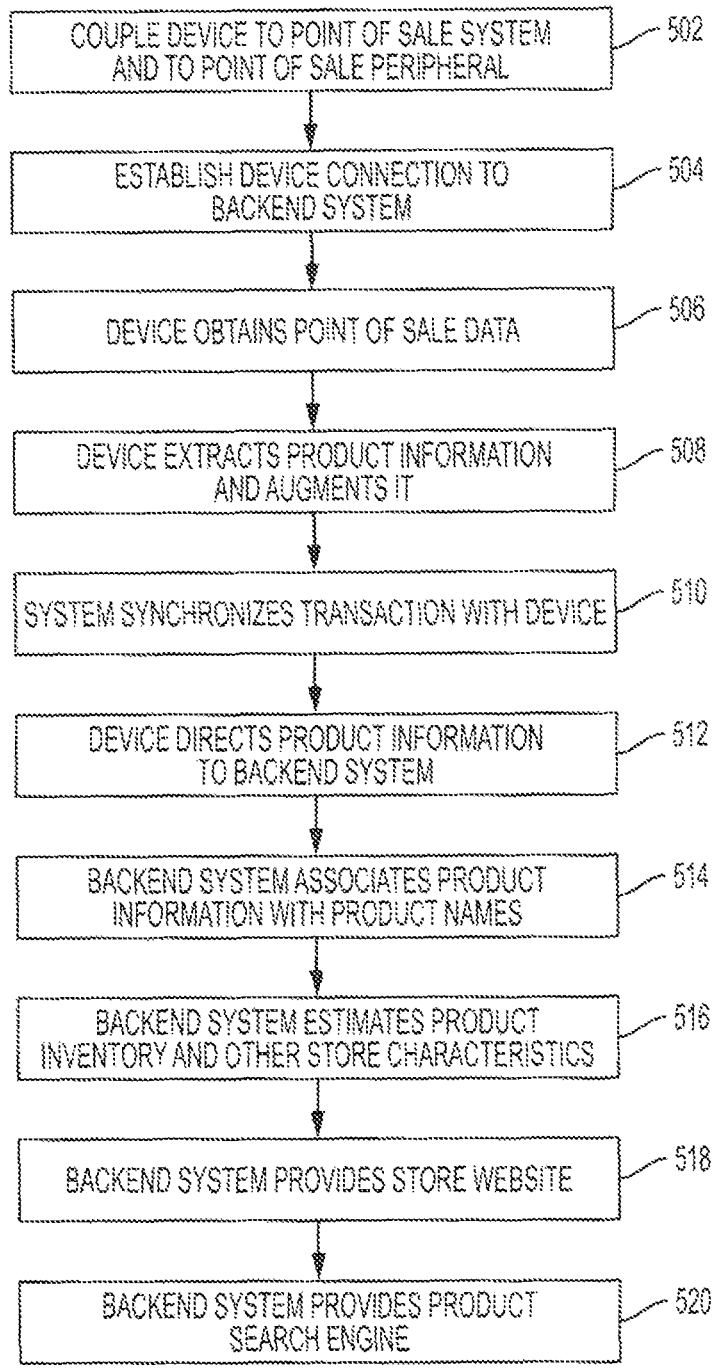
FIG. 5 is a flowchart depicting a method or logging transactions according to some embodiments.

FIG. 5 is a flowchart depicting a method for logging transactions according to some embodiments. The method may utilize a logger device as presented herein (e.g., 110 of FIG. 1, 202 of FIG. 2, 302 of FIG. 3).

At block 502, the logger device is coupled to a point of sale system and to a point of sale peripheral. The point of sale system may be, e.g., a cash register. The point of sale peripheral may be, e.g., a barcode scanner, a receipt printer, or a credit card terminal. A store employee may couple the logger device to the point of sale system and to the point of sale peripheral.

At block 504, the logger device establishes a connection to the backend system. As described above in reference to FIG. 2, the connection may be implemented using the logger device's internee connection hardware 212, e.g., by way of a cellular model, a WiFi connection, or a hotspot. The logger device may establish the connection automatically, upon connection to the point of sale system and/or the point of sale peripheral.

At block 504, the logger device obtains point of sale data. In general, the logger device records the messages sent between the point of sale peripheral and the point of sale system. Thus, the point of sale data may be in raw form. Such messages may encode information of interest in various different ways.

For barcode scanner point of sale peripheral, there are multiple different encodings in which a barcode scanner may send data to the point of sale system. For example, it may use a standard such as USB human interface device (HID), or it may be transmitted in a manufacturer-specific encoding. The logger device (or backend system) may process the logged data to automatically determine the encoding and extract the information of interest (e.g., barcode numbers). There are many signals may be used to aid in this process (e.g., format identifiers, barcode checksums, knowledge of the format determined using previous transactions from the same logger cross-referencing with information from the receipt printer, manual intervention, etc).

For a receipt printer point of sale peripheral, more complex processing may be used to extract data from receipt printer logs. Data sent to a printer may correspond to a direct encoding of text, in variety of formats. In these cases the logger device (or backend system) may detect the encoding and convert the text precent in the receipt to a standard format. However, the information sent to the printer may encode an image of the text, e.g., a bitmap. In these cases optical character recognition (OCR) may be used to recover the receipt text.

At block 508, the logger device extracts product information. Thus, once the receipt text has been recovered, the logger device (or backend system) may apply further processing to determine what parts of the text specify information of interest (e.g., product names and prices) and which parts are irrelevant (e.g., "thanks for shopping with us"). To do this, the logger device for backend system) can again use a variety of signals (e.g., textual signals, receipt templates inferred from multiple transactions in the same retail outlet, known number and/or name of items in transaction based on information from the related barcode scanner log, manual intervention, etc.).

As part of block 508, the logger device may augment the product information. This may be performed even if the backend system performs other portions of block 508. In some embodiments, the augmentation may be omitted. The supplemental information may include any, or a combination, of product name, price of items sold time and/or location of sale, the sets of item sales which form a single customer transaction, detection of non-sales events such as refunds, returns, discount redemptions, etc. any other ancillary information which might be useful for analysis (e.g., logger device identification, name of cashier, customer loyalty program membership, etc.), and generic information about the store that can be determined by analysis of the logged data, e.g., opening hours, top-selling products, etc.

At block 510, the system synchronizes the transaction with the logger device. Note that a single retail location may include multiple logger devices, and the logger devices may communicate with the backend system independently. The backend system may synchronize two or more streams of data (from the barcode scanner and receipt printer, for example) so that the backend system may correctly associate which portions of the barcode scanner and receipt printer logs correspond to the same individual retail transaction. This synchronization process may use a variety of signals (e.g., timestamps, or other properties of the transaction data such as number and kind of item present, etc.)

At block 512, the logger device directs the possibly-augmented product information to the backend system. The logger device may utilize its internet connection to do so. To that end, each logger device may be coded with uniform resource locator (URL) for the backend system.

At block 514, the backend system associates product information with product names. This block may be used in the context of a search engine such that customers may search for product names rather than barcode numbers. In general, there is no master database which provides a name and picture for a product with a given barcode. Several databases do exist, however, their coverage is only partial. Thus, some embodiments use a mixture of techniques.

Thus, block 514 may obtain initial information by referring to existing databases. This information may be augmented using web search together with data extraction technology. It is often the case that different databases and extraction techniques provide names and image candidates that do not agree. In such instances, the process may select or synthesize the best name and image for the item by applying machine learning techniques to the aggregate data.

If no information is available in existing databases or anywhere on the web, the process may use the unique data provided by the logger device. More particularly, the process may scrutinize the aligned barcode scanner and receipt printer logs to determine name candidates for a given barcode. Using the information from logs across multiple shops, the process may have many such name candidates for a given barcode number. The process can then infer a name for the liter by combining these name candidates with various signals. For example, a simple approach may simply select the most common name. Better results may be achieved using external signals such as language models or information from the web. Thus, name information for barcodes may be determined went when they are not present anywhere online or any of the existing databases.

Another source of barcode name information is available from crowd-sourcing. A retailer using the system may manually enter information or correct any errors in the backend data. In some embodiments, the association data between barcodes and product names may be performed r supplemented using such a manual procedure.

To conclude block 514, the backend system may store a record to the data relating to the transaction, including product name, cost, time of purchase, etc.

At block 516, the backend system estimates product inventory.

Note that the product data represents a record of transactions taking place in a store, but does not directly provide knowledge of whether or not a given item is currently in stock in the store. However, such information is of interest to customers of the system. Therefore, the process may estimate inventory information based on analysis of the transaction records. There are many signals may be used to estimate the in-stock status of an item.

One signal, referred to as "zero scan", involves detecting a sudden drop in transaction volume for an item. For example, if the process determines that a store typically sells ten loaves of bread per hour, and it notes that sales of bread fall to zero for an unusually long period, the process may infer that it is out of stock. This can be refined with knowledge of typical daily/weekly/monthly sales patterns for items.

An additional or alternative method is to directly estimate the number of items still in stock. One way to this is for the retailer to perform a special scan of items when restocking them. Another approach is attempt to estimate stock levels without retailer intervention. For example, a retailer selling biscuits might receive from their supplier a shipping container with 20 consumer-sized packages of biscuits. Aware that this product comes in shipping containers of 20 items, the process may infer that it is out of stock once it observes that 20 items have been sold. Even for items where the process does not know the size of the standard shipping container, or for which are not sold in standard quantities, the process can estimate how many items a retailer typically places on display at one time by observing quantities of the item sold between successive zero scans. These estimates may be improved by combining information across shops.

Further, the process may let a customer know that they should check directly with the store. For example, the process may provide the store phone number, e.g., on an app of the customer's mobile device. An alternative to the customer phoning the store would be an approach where the customer presses a button to indicate that they are interested in the in-stock status of an item. The process may then deliver an alert to the retailer which they can answer by means of a similar button-push on a mobile device app.

As part of block 516, the process may estimate other store characteristics. That is, the process can determine some key information about the store from analysis of the logged data as a whole. For example, the process can automatically estimate opening hours by looking at the times when point of service transactions typically begin and end. The process can also automatically determine the category of the store (e.g., grocery store, bike store, etc.) based on the inventory it carries.

At block 518, the process provide, a store website. That is, the process may automatically construct a website or online store. Unlike existing offerings, this process is much easier using the disclosed process. The retailer simply plum in the logger device, and their online store will be automatically constructed, complete with product names and images for most items. This is substantially more convenient than existing solutions that require more manual work by the retailer and/or more invasive changes to their in-store point of sale hardware.

At block 520 the process provides a search engine based on the obtained product data. Such data can be combined with existing data from large retailers to achieve better coverage. The search engine may be presented on a web page or mobile device app, and allow a customer to enter a search query (e.g., the name or description of a product) and obtain search results representing where that product is available for sale. The process may perform a variety of techniques to improve the customer search experience, for example: spelling correction, query expansion or refinement, handling of synonyms, optional terms, result diversity tuning, various machine learning techniques for ranking, etc.

The quality of the obtained product data may provide some additional search engine possibilities which have not been previously available. For example, the sales popularity of an item may be a useful ranking signal for the search results. Further, the process provides access to sales data at a fine-grained level that was not previously available. For example, if a customer searches for "cola", having access to the relative sales of various brands of cola in a particular geographic area may allow the process to determine which one is likely most relevant to the customer given their geographic location. The process may also have novel sources of information on item popularity by time of day, items frequently bought together, item popularity versus weather conditions, etc. All these signals may be useful in search and also in targeted advertising applications.

There are several revenue models that may complement to the search service. Note that the term "advertisement" as used herein refers collectively to both standard promotional messages and the discount offers described in detail herein.

A first model, direct sales, is to offer the customer the option to directly buy an item when they find it in search results. The item might then be available for collection from the local store, or delivered to the customer. The process may generate revenue by charging retailers a fee for each item sold.

A second model, reservation service, offers the customer the ability to reserve an item they find via the search engine. In this service, the retailer may place the item aside to guarantee that it is available for the customer to purchase when they visit the store. The sales transaction may be completed at the store. The process may charge the retailer or the customer a fee for this reservation service.

A third model is pay-per-impression and pay-per-click advertising. In such a model, if a customer searches for a product, the search engine can display relevant advertising as determined by the search terms, customer profile, location, other signals, etc.). The advertiser pays either when the ad is shown (pay-per-impression), or when the customer clicks on the ad (pay-per-click).

A fourth model, pay-per-visit advertising, the process displays a relevant a, on the same web pager, or app screen as the search engine, when the customer performs a search. The ad shown may promote a particular product range or a particular store. The process may charge the advertiser when the customer physically visits the relevant store (or in the case of a product, a store where it is in stock), whether or not any purchase is actually made. The physical visit can be verified by way of the customer's mobile device, e.g., either by location collection using an app provided to the customer, or by an in-store collection system with knowledge of some other characteristic of the customer's mobile device such as WiFi MAC address Bluetooth Low Energy identifier, information from a cellular picocell, etc.

Figure 6:
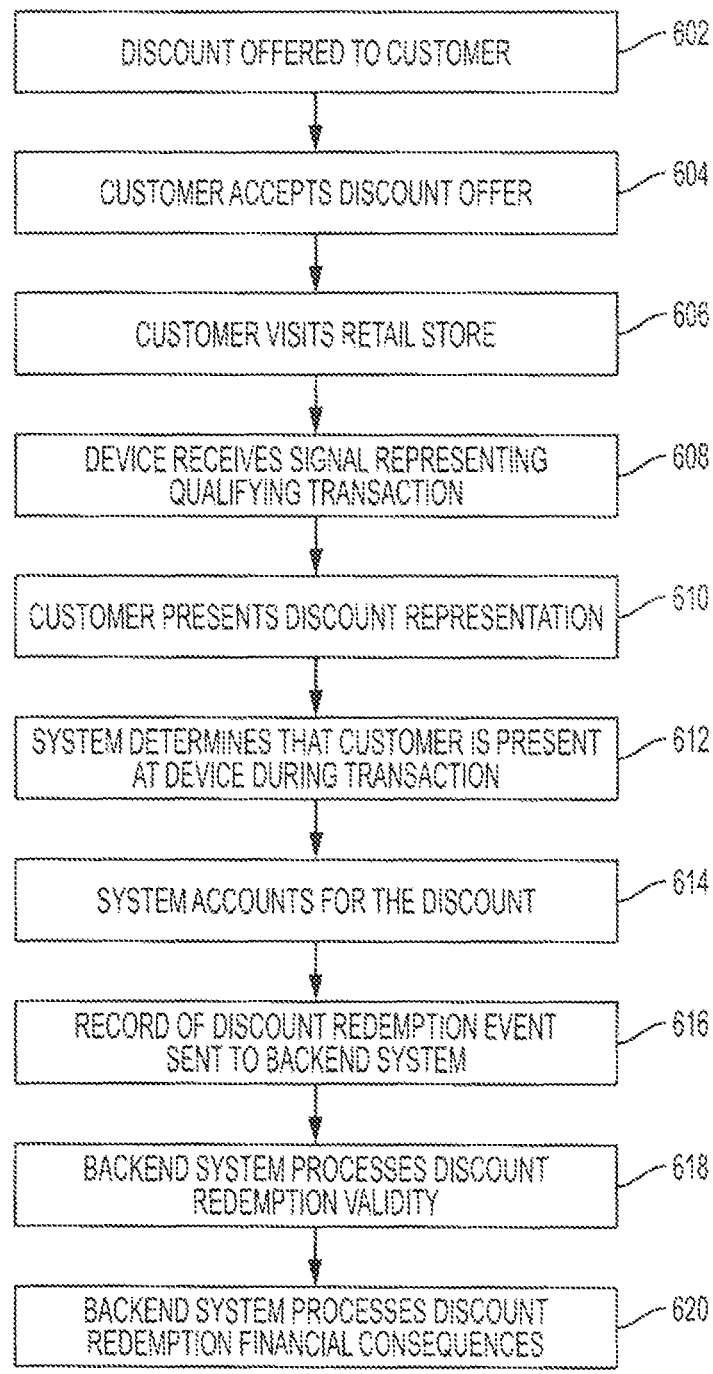
FIG. 6 is a flowchart depicting a method of redeeming a discount according to some embodiments.

A fifth model, described below in detail in reference to FIG. 6, is pay-per-action advertising (discounts). In this model, when the customer performs a search, a discount offer may b presented to the customer. The advertiser pays only when the customer makes a purchase using the offer. The process enables novel discount offer possibilities. For example, it can distribute the discount offers for free and charge the manufacturer only when they are redemed. It can also perform relevance-based targeting of discount offers.

Note that discount offers traditionally are distributed in broadcast fashion, for example printed in magazines. This provides very limited ability to control the discount offer campaign. Discount offers are also distributed online, which offers somewhat better control. However, a key problem is that traditional discount offers are "generic" in the sense that, once issued, it can be redistributed in various ways and redeemed by anyone. As such, even discount offers distributed online do not allow very precise targeting. By contrast, each discount offer of some embodiments is unique, valid only for a particular customer in a particular store (or small set of stores). Once the customer redeems the discount offer, it is no longer valid. It cannot be passed on to anyone else. Unique discount offers may be created when the customer performs a search and may be targeted to a very specific circumstance in a way that traditional discount offers cannot. This is possible because some embodiments control both the issue of discount offers, and their redemption using logic built into the in-store logger device.

The disclosed design offers a number of advantages. A issuer of the discount offer can achieve much more precise control of their budget, for example. As mentioned, they can also perform precise targeting. For example, a brand could specify that discount offers are presented only to customers matching some criteria, such as location or demographics. The process may also restrict distribution only to customers who have n t previously redeemed a discount for a given brand, or who have not done used for more than some set period of time. A shop may similarly offer a discount offer only to new customers or only to loyal customers. A shop may also compete for business, for example, by offering a discount when it appears in search results but is not the nearest store to a customer stocking a given item. Similarly, a brand may offer a discount when the customer searches for a generic term such as "blender", but not when the customer searches for a product specifically by name or brand. Discount offers can also, be offered in cross-promotional circumstances or in re-targeting scenarios, such as offering discounts for garden fertilizer to people who have recently searched for plant seeds, etc.

The above-discussed revenue models that complement the search service may be applied in the context of the process of FIG. 6, described presently.

FIG. 6 is a flowchart depicting a method of redeeming a discount according to some embodiments. According to some embodiments, the discount may be a coupon. The method may utilize a logger device as presented herein (e.g., of FIG. 1, 202 of FIG. 2, 302 of FIG. 3).

At block 602, a discount offer is presented to a customer. This may occur via prior art techniques for such offers, e.g., publication in magazines. However, according to some embodiments, the offer is presented using a search engine as disclosed herein. In such embodiments, the discount offer presented to the customer may be unique, generated based on their search actions, demographics, past purchase behavior, and any other relevance signals. The discount offer may have very specific validity, for example, limited to single physical retail location or product purchase combination. The search engine might be available via a website or mobile device app.

At block 604, the customer accepts the offer. The customer action of accepting the discount offer might consist of a physical action such as printing the offer, or an electronic action such as a touch or gesture event within a mobile device app. The customer's acceptance may be recorded at the backend system for later verification. More particularly, the customer's acceptance may include sending a message to the backend system, e.g., using a customer's mobile device executing an app, where the message includes an identification of the offer and the customer. Note that this lock is optional in some embodiments.

At block 606, the customer visits a retail store for which the discount offer applies. This may be accomplished in a conventional manner.

At block 608, a logger device (e.g., 110 of FIG. 1, 202 of FIG. 2, 302 of FIG. 3) receives a signal representing a qualifying transaction. This may be accomplished by the logger device receiving a signal from an attached barcode reader representing a scan of an item for which the discount applies. That is, this block may occur when the customer (or retail employee) scans an item amenable to the discount using a barcode scanner, and a connected logger device (e.g., 110 of FIG. 1, 202 of FIG. 2, 302 of FIG. 3) intercepts the resulting signal. According to some embodiments, the logger device may communicate to the backend system that it has received such a signal.

At block 610, the customer presents a representation of the discount at the point of sale. Note that this block may be omitted according to some embodiments. The representation may be an image, e.g., bar code, printed on paper, or an image depicted on a display of an electronic mobile device of the customer. The presence of logger devices at the retail point of sale allows the process of block 610 to be at least partially automated in several ways. This has multiple benefits, including greater efficiency, educed fraud potential and a better ability to target discount offers. Nevertheless in general, the actions of this block may occur by the customer scanning a barcode representing the discount on his or her mobile device with a logger-device attached barcode reader.

However, some barcode scanners lack the ability to read a barcode from an electronic device screen. For example, some laser-based barcode scanners can read a barcode only when it is physically printed on paper, plastic, etc. Barcodes displayed on computer screens typically cannot be read successfully by such scanners Barcode scanners with alternative designs (e.g. charge-coupled-device-based and imaging scanners) do not suffer from this problem. However, laser-based scanners are widespread. Some embodiments may accommodate for this potential problem as described in reference to two cases below.

Case 1:

The point of sale includes a logger-device-attached barcode scanner that can carp successfully read a barcode representing the discount that the customer presents on a mobile device. In this case, the customer simply presents their discount barcode representation and the retailer scans it during the purchase transaction. The logger device attached to the barcode scanner can validate the discount and record its redemption. This case covers various possibilities: (1) The customer has a discount representation printed on paper, (2) The customer has a discount representation in electronic form (e.g., on a mobile device app), and the point of sale barcode scanner is able to read a barcode from the smartphone screen, either because the barcode scanner uses a technology such as a charge coupled device, or because the mobile device has been modified for compatibility with other barcode scanner technologies, for example.

Case 2:

The point of sale barcode scanner cannot read a barcode discount representation that the customer presents on a mobile device. The fact that the customer has a valid discount that they wish to redeem may accordingly be determined by other techniques. The customer may begin the process by indicating their desire to redeem a discount via an action on their mobile device. There are a number of different approaches that can be used to achieve this, described as three sub-cases immediately below, and further described in reference to FIG. 7 far below.

Sub-Case 1: Customer Device to Logger Device.

In this sub-case, the customers mobile device (e.g., smart hone)) transmits a message representing the discount directly to the logger device by means of a short-range communications technology (e.g., near-field communications, Bluetooth, Bluetooth Low Energy, WiFi, etc). Sub-case 1 is further illustrated as technique 702 in FIG. 7 below.

Sub-Case 2: Customer Device to Backend System, Backend System to Logger Device.

In this sub-case, the customer's mobile device sends a message representing the discount to the backend system infrastructure via the internet. The backend system may then send a message to the logger device at the point of sale. Sub-case 2 is further illustrated as technique 704 in FIG. 7 below.

Sub-Case 3: Customer Device to Backend System.

Logger Device to Backend System, Backend System to Logger Device. In this sub-case, the customer mobile device sends a message representing the discount to the backend system. The logger device also transmits a message to the backend system. The message sent by the logger device may be initiated by some action taken by the retailer when a customer wishes to redeem a discount. For example, they may press a button on the point of sale logger device hardware, or scan a special barcode. The backend system then sends a message back to the logger device with the discount information. Sub-case 3 is further illustrated as technique 706 in FIG. 7 below.

At block 612, the system determines that the customer is present at the logger device during the transaction. Note that functionality of this block at least partially overlaps with that of block 610 such that for embodiments that employ block 610, portions of either this block or block 610 may be omitted.

There are several techniques that may be used to determine customer proximity to the point of sale. Such techniques include using a wireless communications technology such as Bluetooth, Bluetooth Low Energy (iBeacons), WiFi, NFC, etc. This may occur in either direction, logger device to customer mobile device, or vice versa Such techniques are elaborated in reference to FIG. 7 below. Alternately, the technique may include a passive process from the customer's point of view, namely, logger devices or customer mobile devices may transmit their unique identifier by default, so if the backend system is apprised of the customer's unique identifier, it may associate the two. Alternately, the technique may use sound, for example, ultrasound. Thus, the logger device may emit a unique ultrasonic pattern that an app executing on the customer's mobile phone can detect, or vice versa Alternately the technique may include the customer physically scanning some unique marker proximate to the logger device, e.g., a QR code. Alternately, the technique may include the logger device recognizing the customer's mobile phone rather the vice versa. Alternately, the technique may include the customer's mobile device providing position information, e.g., using global positioning system (GPS). Alternately, the technique may include the retailer confirming the customer's presence by some manual action. Such manual action may include, for example, the customer handing their phone to the retailer and the retailer inputting a code to an app executing on the customer phone to confirm customer proximity. Such manual action may alternately include the retailer stamping the customer's mobile device screen with a unique capacitive pattern. Such manual action may alternately include a mobile device of the retailer receiving a prompt, e.g., with an image of the customer.

An alternative method to determine at which point of sale the customer is present may be for the logger device to collect the identifier for a customer-associated payment method used in the transaction. For example, if the logger device detects the customer's credit card number, then the system can determine that the customer is present when the payment method is used.

Yet another alternative to establishing customer proximity may be implemented without the need for the customer to take action on their mobile device to indicate their desire to redeem the discount. In such an embodiment, the discount redemption could be triggered automatically when the logger device or backend system detects that the customer is in a store, has a valid discount, and makes a qualifying transaction.

At block 614, the system accounts for the discount. This may occur in any of several ways.

According to some embodiments, the backend system may store representations of points or other indicia of a discount application. The customer may redeem such points for cash directly from the backend system, for example. Alternately, the customer may apply the points to a subsequent transaction.

In some embodiments, in which the logger device obtains an identification of the discount, processing may proceed as follows. Given the unique identifier for the discount, the logger device may verify the discount, ensure that items in the current transaction are valid for discount redemption, and determine the way in which the transaction total should be adjusted. This may be done by logic internal to the logger device, or by communication with the backend system. The logger device then transmits a message to the point of sale system (e.g., cash register) to affect the necessary change to the transaction total. This may be achieved by means of placing a message on the communications bus that exists between the barcode scanner and the point of sale system, which interprets it as a barcode scan event. Alternately, additional hardware may perform this step. The point of sale system can be configured by the retailer to recognize a small set of barcodes as representing discount events, e.g., "$1 off total", "$1.47 off total", "2 for 1 on last item scanned", etc. The logger device thus performs a mapping between the very large set of unique identifiers for discounts, and a small set of codes which specify how to modify the transaction total. This mapping is described in further detail below in reference to FIG. 8.

Alternately, in some embodiments, the retailer may adjust the transaction total manually.

At block 616, a record of the discount redemption is sent to the backend system. This block is optional according to some embodiments. Nevertheless, if the point of sale system includes a logger device as disclosed attached to a receipt printer, this provides a communications channel by which a discount redemption event may be reported. For example, if the retailer enters the unique discount an identificatior into the point of sale system manually, and this is printed on the receipt, the backend system can detect this event in the logs transmitted by the logger device. In other cases, the retailer may report the redemption event by other techniques, for example, by sending the backend system the unique identification by mail, email, via an online form or application program interface (API), using a smartphone app, etc.

At block 618, the backend system processes the validity of the discount redemption. This block may encompass processing the discount redemption to detect fraud, for example. An example of such fraud includes are attempt to reverse a single-use discount offer.

At block 620, the backend system processes the discount redemption financial consequences. This may take any of several forms. For example third-party payments related to the redemption may be recorded and/or processed. Thus, if the discount was offered by a manufacturer on a particular product, the manufacturer may owe money to the retailer who accepted the discount. The backend system may accordingly orchestrate the related payment. As another example, the backend system may charge the discount offer issuer a fee for services when the discount is successfully redeemed. If the discount was obtained by use of a search engine, the search service revenue models presented above n reference to FIG. 5 may be utilized.

Figure 7:
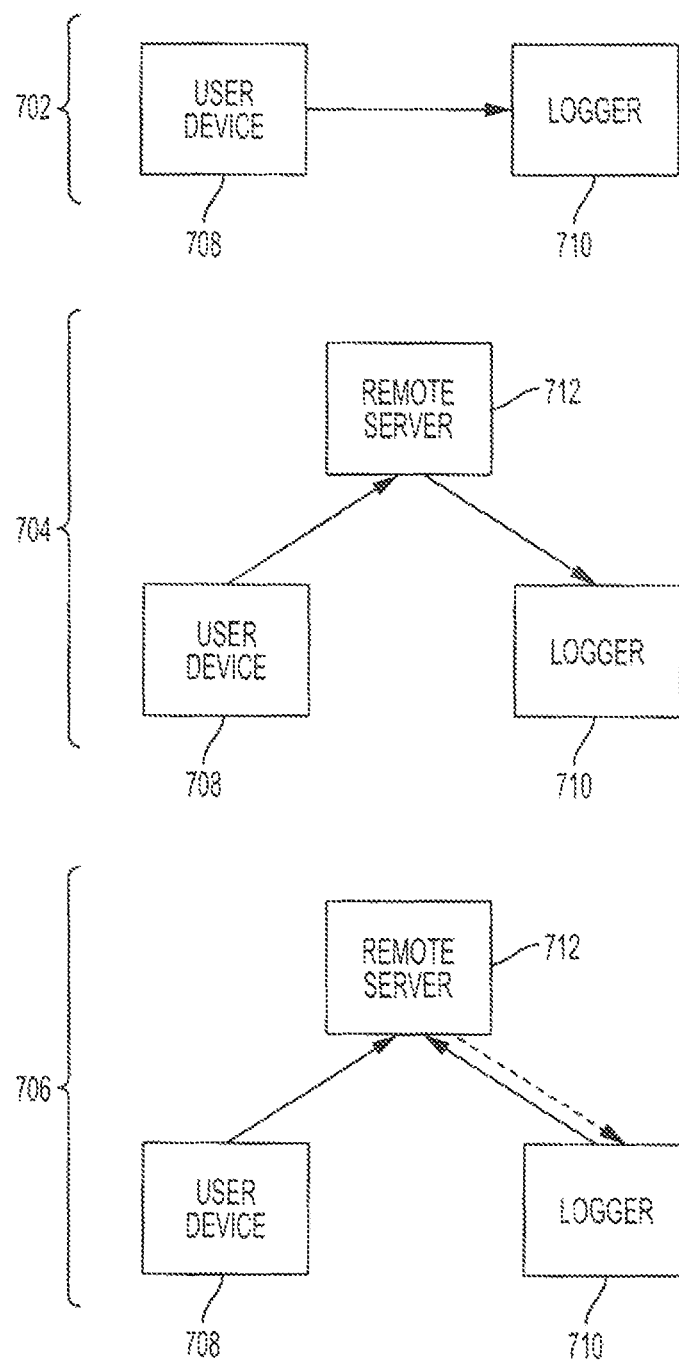
FIG. 7 is a schematic diagram of several techniques for establishing customer proximity to a logger device according to some embodiments.

FIG. 7 is a schematic diagram of several techniques for establishing customer proximity to a logger device according to some embodiments. Thus, the techniques 702, 704, 706 of FIG. 7 may be used to implement block 612 of FIG. 6. Further, the techniques 702, 704, 706 of FIG. 7 may also be used to establish that the customer has presented a discount representation, per block 610 of FIG. 6. The sub-cases presented in the context of block 612 of FIG. 6 are elaborated on below.

Per Sub-Case 1 (702):

The use of a direct transmission from customer device 708 to logger device 710 means that it will generally be easy to identify the point of sale logger device at which the customer is present. However, it may be ambiguous in some cases. For example, if two point of sale locations with attached logger devices are closely adjacent, and the customer transmits their discount redemption request by Bluetooth Low Energy (for example), both adjacent point of sale logger devices may receive a strong signal. The system can handle this ambiguity and apply the discount at the intended point of sale only, by applying additional verification steps as follows, (1) Points of sale in which the current transactions do not contain a set of items which match the discount that the customer is attempting to redeem may be ruled out. (2) The logger devices may communicate with the backend system to determine which is receiving the strongest signal from the customer device. (3) A unique machine-readable identifier may be attached to each point of sale (for example a barcode, QR code, NFC tag or capacitive stamp pattern). The customer may scan or otherwise recognize this code with their mobile device, and the code can be transmitted to the backend system to unambiguously identify the point of sale at which they are present. (4) An alert may be displayed to a retail staff member who can help confirm the correct point of sale by taking an action (e.g., pressing a button on the associated logger device, scanning a special barcode, pressing a button on a smartphone app, etc.). This technique may operate as a fallback if the previous methods fail. The alert may be by way of a visual indication on a logger device, or by a message in a smartphone app used by the retailer, for example.

Per Sub-Case 2 (704):

For this technique, the data from the customer discount representation is sent to backend system 712. Backend system 712 determines which logger device 710 of a potentially large number of logger devices to relay the discount information to. The technique can establish the correct logger device 710 by using information sent in the representation from the customer's mobile device 708. For example, backend system 712 may make use of the identifiers and signal strengths of nearby WiFi devices (including that of logger device 710, or additional equipment installed at the retail location) to identify the location of the customer. A similar check may be performed using other technologies such as near-field communications, Bluetooth and Bluetooth Low Energy. The technique may also make use of other location information available on the customer device, such as a recent global positioning system fix. In some instances, this will unambiguously identify the point of sale at which the customer is present. If the point of sale remains ambiguous, additional verification steps as discussed in relation to Case 1 may be used.

Per Sub-Case 3 (706):

This technique uses an additional step to reduce ambiguity as to the point of sale at which the customer is present. In this technique, customer device 708 sends a discount representation signal, and the retailer takes an action when a discount offer is being redeemed. This results in a message to backend system 712 that identifies the retailer (and optionally also the specific logger device 710) involved in the transaction. Backend system 712 can follow a similar process as in Case 2, but can use the additional signal generated by theretailer to reduce any ambiguity. For example in Case 2, backend system 712 has a large set of possible logger devices to select from. In Case 3, this set is reduced to only those logger devices for which the relevant retailer signal has been sent in the last few seconds.

Figure 8:
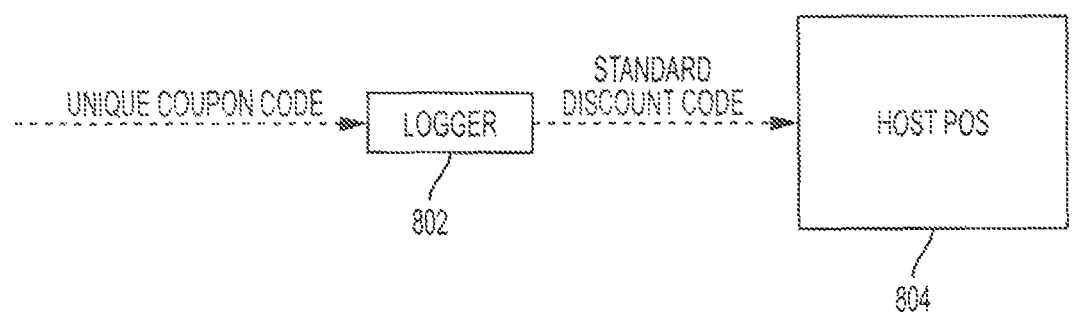
FIG. 8 is a schematic diagram of a technique for translating a discount code to an accounting code according to some embodiments.

FIG. 8 is a schematic diagram of technique for translating a discount code to an accounting code according to some embodiments. This technique may be used as part of block 616 of FIG. 6. In particular, FIG. 8 schematically illustrates mapping a discount representation code (e.g., a coupon code) received by logger device 802 to a discount signal readable by the point of sale system 804 (e.g., cash register). Such a mapping per its the assurance of discount offers that are highly targeted. In particular, because it enables associating a unique code with each issued discount offer, sonic embodiments can automatically enforce complex criteria on the circumstance in which the unique discount offer can be redeemed (e.g., location, set of products, etc., as verified by the logger device). The retailer, on the other hand, need only configure their point of sale system to recognize a small set of signals corresponding to the ways in which the transaction total should be adjusted. Note that embodiments can still retain fine-grained control over the discount amount by use of the "variable weight encoding" system used in Universal Product Codes, for example.

Figure 9:
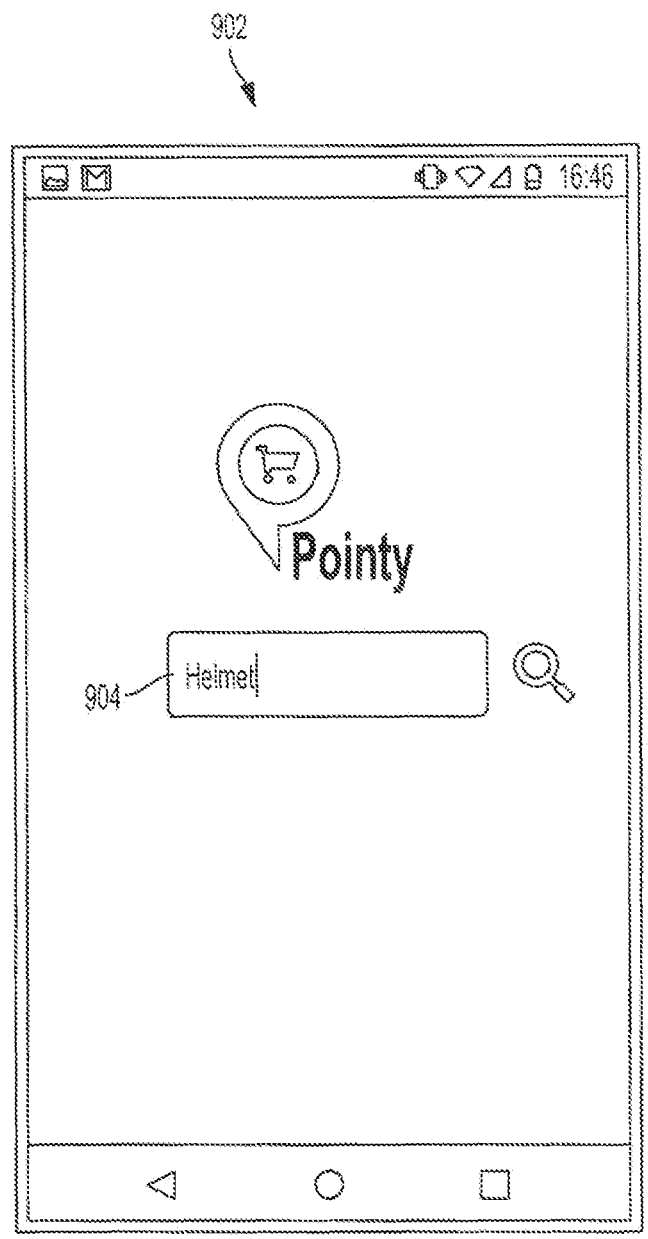
FIG. 9 is an example screenshot of a search engine according to some embodiments.

FIG. 9 is an example screenshot of a search engine 902 according to some embodiments. Search engine 902 may be a search engine configured to provide, in response to a customer query, search results based at least in part on a product inventory based on data provided by logger devices (e.g., 110 of FIG. 1, 202 of FIG. 2, 302 of FIG. 3). Search engine 902 may be presented on a web page or mobile device app, for example. As depicted in FIG. 9, search engine 902 includes field 904 into which a customer may enter a search query, in this example, the term "helmet".

Figure 10:
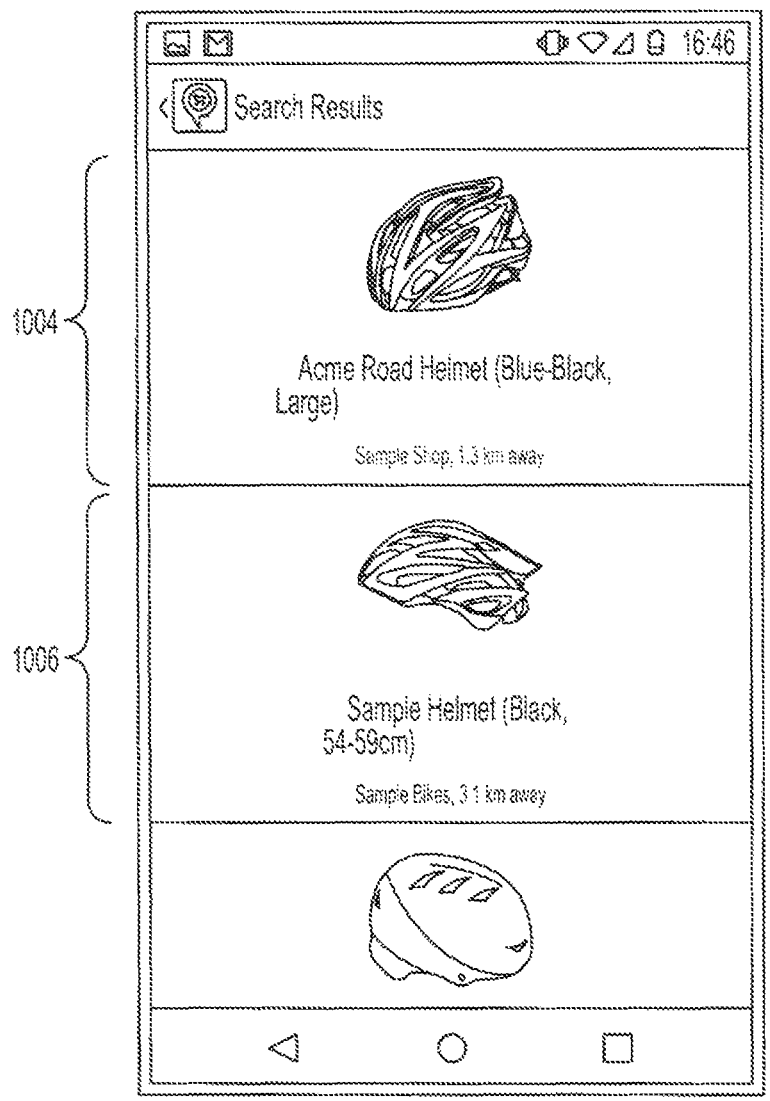
FIG. 10 is an example screenshot of example search results according to some embodiments.

FIG. 10 is an example screenshot of example search results according to some embodiments. The search results may be obtained from, e.g. search engine 902 of FIG. 9. As depicted in FIG. 10, results for the search query "helmet" include a representation of Acme helmet 1004 and Sample helmet 1006. Note that the search results also depict the associated shop that has the respective helmet in inventory as determined by embodiments disclosed herein, as well as a distance from the mobile device (for example) on which the search engine is displayed.

Figure 11:
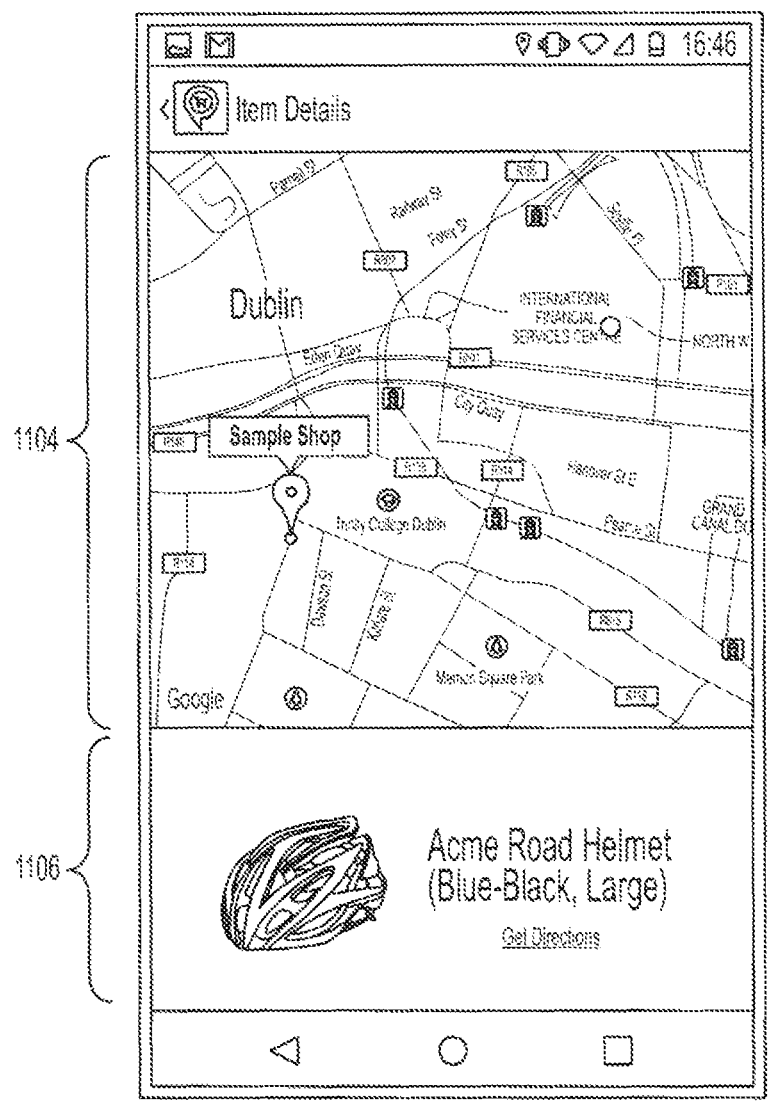
FIG. 11 is an example screenshot of example product details according to some embodiments.

FIG. 11 is an example screenshot of example product details according to some embodiments. The depiction of FIG. 11 may be a result of a customer clicking on a particular search result of FIG. 10, e.g., Acme helmet 1004. As shown, the depiction includes map section 1104 showing a location of the store having the helmet in stock, and product section 1106 showing an image of the respective product, in this example case, an Acme helmet.

Figure 12:
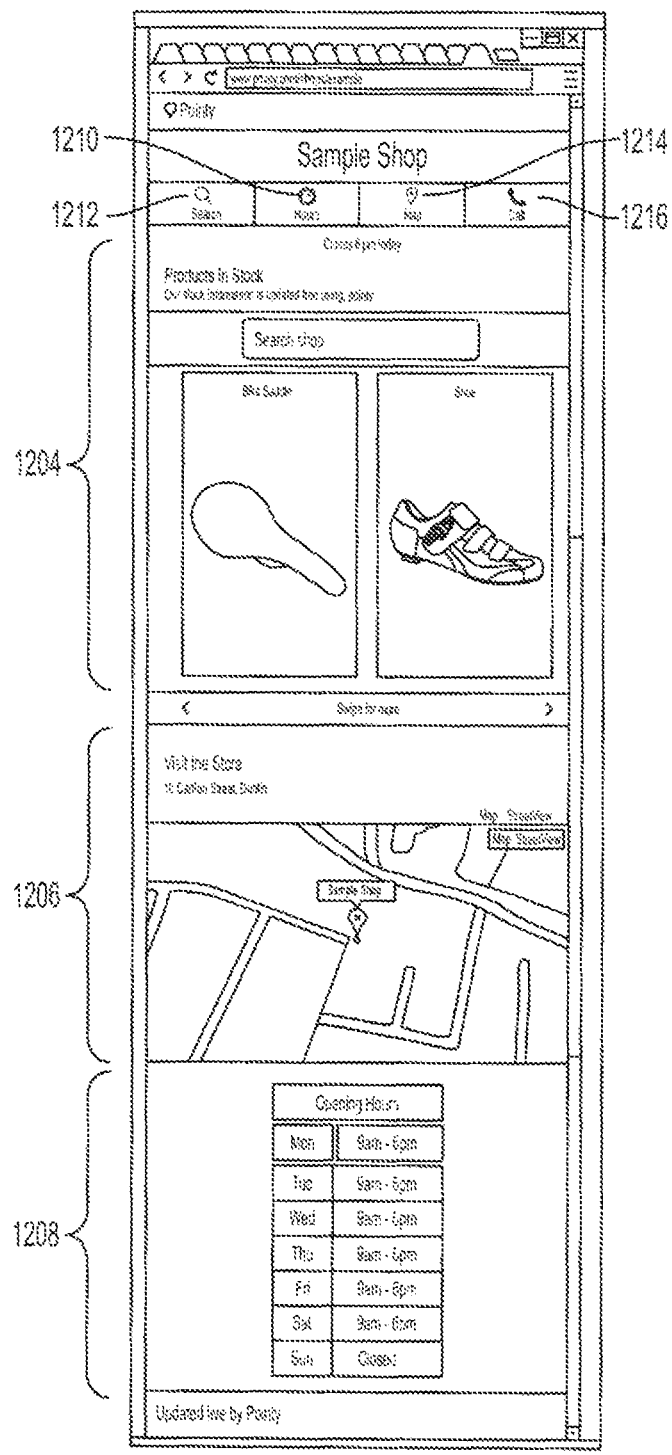
FIG. 12 is an example screenshot f example store details according to some embodiments.

FIG. 12 is an example screenshot of example store details according to some embodiments. The depiction of FIG. 11 may be a result of a customer clicking on a particular link to a shop in search results, e.g., as shown in FIGS. 10 and 11. Thus, the store details include a section 1204 for searching the inventory of the particular store (including a field into which a customer may enter search query), a section 1306 depicting the store location on a map, and a section 1208 depicting the store's hours of operation. Also present are search button 1212, hours button 1210 map button 1214, and call button 1216. Activating buttons 1212, 1210 or 1214 may cause the screen to scroll to the respective section. Activating button 1216 may cause the website or mobile device on which the search engine is depicted to initiate placing a phone call to the respective store.

Many variations of the embodiments presented herein are possible. Details of some such variations are disclosed presently.

A retail outlet need not attach logger devices to all of their barcode scanners and receipt printers. In some cases, it may be impractical or unnecessary to do so. For example, receipt printers are sometimes integrated into cash registers rather than connected externally via a cable, in which case attaching a logger device may be impractical. This is sometimes also the case for barcode scanners. Also, the retailer might wish to attach logger devices to some of their point of sale systems but anothers for reasons of cost.

Some embodiments permit logging from alternative point of sale equipment. In general, some embodiment employ logger devices in conjunction with two peripherals of a point of sale system, namely, the barcode scanner and the receipt printer. However, some embodiments may extract relevant data by logging from any of the other pieces of equipment present at a typical retail point of sale. For example, data sent from a point of sale system to a visual display may be logged. Similarly, some embodiments may log data sent from a point of sale system to a credit card reader or other payment device, or data sent from a payment device back to a point of sale system or over an external network.

Some embodiments integrate the logger device into the peripherals. In such embodiments, instead of the logger device being implemented as a separate piece of hardware, it may be implemented as part of modified barcode scanners or other peripherals, which included an integrated logger device. That is, the functionality of the logger device may be integrated directly into the peripheral.

Some embodiments obtain price information from payment processing networks. As an alternative to obtaining item price data by logging from a receipt printer, some embodiments instead obtain the payment totals for transactions from a payment processing company that services the retailer's credit card terminal. Such embodiments may associate payment totals with a list, of items present in a transaction: the list of items may be obtained for the logger device, and the association may be performed by use of timestamps and/or estimated price totals obtained from external data sources. By collecting multiple such <item list, payment total> pairs, the price of each individual item may be found by solving a simple linear algebra problem. This technique avoids the need to attach a logger device to the receipt printer to obtain rice information.

Some embodiments collect data from a point of sale computer system directly. Such embodiments log from the point of sale system directly. In general, a "point of sale system" means the central element of a point of sale system that coordinates the peripheral devices. Typically, this point of sale system includes a computer, albeit perhaps in a specialized form, for example an electronic cash register. Some logger devices collect data by interfacing with this point of sale system directly. Such embodiments enable collection of transaction information along with details of item names and prices.

In many cases the point of sale system includes a standard computer running a typical operating system such as WINDOWS or LINUX. In these cases, the logger device may be implemented as a software program executing on this computer, coupled with a mechanism for sending logged data over the internet. This may be provided for example by means of a USB-attached cellular modem, for example. An alternative to running on the point of sale system computer directly is to run such software on independent hardware, and to communicate with the point of sale system over a local network.

Some embodiments can provide a variety of analytic reports to a variety of entities. For example, data collected by some embodiments can be used to provide the retailer with a convenient report on how their store is performing. Embodiments may automatically construct reports showing the retailer their sales by day or month, products that are selling well or poorly, products which need restocking soon, performance of loyalty programs, etc. Compared to existing solutions, some embodiments allow for the combination of data across multiple point of service devices or multiple stores, and the presentation of it to the retailer online or on a mobile device.

As another analytics example, the totality of the collected data also provides the ability to offer sophisticated analytics to small retailers. For example, if an embodiment detects (using data from across all stores) that a particular product has become newly popular, it can be suggested to stores that do not yet carry it. If the data reflects that two products are frequently purchased together, and a particular retailer stocks only one of these products but not the other, it can be suggested they may increase sales by adding the second product. Many other such optimization opportunities are possible. A fee may be charged to deliver such reports to the product manufacturer and/or retailer.

As yet another analytics example, some embodiments can offer analytics services to manufacturers. In general, data for small stores is lamely absent, delayed, manually collected at high cost or inferred from other sources. Some embodiments provide manufacturers with a fine-grained and instantly-updated view of their sales. Some embodiments provide a fine-grained geographic breakdown. Overall, some embodiments enable novel applications, for example, faster feedback on sales can enable dynamic fine-tuning of advertising, or optimizing production and logistics based on a clearer picture of current demand.

As yet another example of analytics, some embodiments can provide analytics services that may be of interest to financial market participants or those interested in wider economic indicators. That is, some embodiments may use collected data to construct real-time estimates of inflation, retail sales, sales of a particular manufacturer, etc.

Certain embodiments can be performed in part as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for logging retail purchases, the system comprising a backend system and a logger device, the logger device configured for installation at a retail location, the logger device comprising:
   a first wired connector configured to be communicatively coupled to a point of sale system at the retail location, wherein the point of sale system comprises a sales register;
   a second wired connector configured to be communicatively coupled to a barcode scanner at the retail location, wherein the logger device is configured to be communicatively inserted between the point of sale system and the barcode scanner;

a communications bus directly connecting the first wired connector to the second wired connector;
a wireless interface communicatively coupled to the backend system; and
at least one electronic processor configured to:
obtain, from the communications bus, barcode data sent from the barcode scanner to the point of sale system, wherein the barcode data is not actively transmitted to the point of sale system by the logger device, and wherein the barcode data represents a purchase transaction of a product by a customer; and
provide the barcode data to the backend system;
whereby the logger device receives the barcode data without disrupting communication between the point of sale system and the barcode scanner; and
the backend system comprising at least one electronic server computer communicatively coupled to the internet, the backend system configured to:
receive the barcode data from the logger device;
determine product information from the barcode data; and
generate, automatically, and based on at least the product information, a publicly available webpage for the retail location, the webpage displaying an at least partial listing of items for sale at the retail location, the at least partial listing of items for sale comprising at least the product.

2. The system of claim 1, further comprising a search engine configured to accept queries for retail products and provide search results based at least in part on the at least partial listing.

3. The system of claim 1, wherein the at least one processor is configured to augment the barcode data to produce augmented point of sale data, and wherein the augmented point of sale data is sent to the point of sale system.

4. The system of claim 1, wherein the wireless interface is configured to direct the barcode data to an internet-connected device configured to send the barcode data to the backend system.

5. The system of claim 1, wherein the system is further configured to provide product sales data for the retail location based on information derived from a plurality of barcode scans at the retail location.

6. The system of claim 1, wherein the system is further configured to provide aggregated product sales data for a plurality of retail locations based on information derived from a plurality of barcode scans at the plurality of retail locations.

7. The system of claim 1, wherein the system is further configured to detect that the customer viewed an online advertisement for the product.

8. The system of claim 7, wherein the system is further configured to charge a fee for the customer viewing the online advertisement and purchasing the product.

9. The system of claim 1, wherein the backend system is further configured to update the at least partial listing of items for sale of the webpage with products purchased by other customers from the retail location.

10. A method of logging retail purchases using a backend system comprising at least one server computer communicatively coupled to the internet and a logger device communicatively coupled to a point of sale system comprising a sales register, and to a barcode scanner, at a retail location, the method comprising:
establishing a wireline communicative connection of the logger device to both the barcode scanner and to the point of sale system, wherein the logger device comprises a communications bus that directly connects the barcode scanner to the point of sale system, whereby the logger device is communicatively inserted between the point of sale system and the barcode scanner;
obtaining barcode data, by the logger device, sent from the barcode scanner to the point of sale system without disrupting communication between the point of sale system and the barcode scanner, wherein the barcode data is not actively transmitted to the point of sale system by the logger device, and wherein the barcode data represents a purchase transaction of a product by a customer;
directing, by a wireless interface of the logger device, the barcode data to the backend system;
determining, by the backend system, product information corresponding to the barcode data; and
generating, automatically, and based on at least the product information, a publicly available webpage for the retail location, the webpage displaying an at least partial listing of items for sale at the retail location, the at least partial listing of items for sale comprising at least the product.

11. The method of claim 10, further comprising providing a search engine configured to provide search results based at least in part on the at least partial listing in response to a query for a retail product.

12. The method of claim 10, further comprising:
augmenting the barcode data to produce augmented point of sale data; and
sending the augmented point of sale data to the point of sale system.

13. The method of claim 10, wherein the directing comprises directing the barcode data to an internet-connected device configured to send the barcode data to the backend system.

14. The method of claim 10, further comprising providing product sales data for the retail location based on information derived from a plurality of barcode scans at the retail location.

15. The method of claim 10, further comprising providing aggregated product sales data for a plurality of retail locations based on information derived from a plurality of barcode scans at the plurality of retail locations.

16. The method of claim 10, further comprising detecting that the customer viewed an online advertisement for the product.

17. The method of claim 16, further comprising charging a fee for the customer viewing the online advertisement and purchasing the product.

18. The method of claim 10, further comprising updating the at least partial listing of items for sale of the webpage with products purchased by other customers from the retail location.

* * * * *